(12) United States Patent
Cho (10) Patent No.: US 10,706,521 B2
(45) Date of Patent: Jul. 7, 2020

(54) INSPECTION METHOD (75) Inventor: Soo-Young Cho, Seoul (KR)

(73) Assignee: KOH YOUNG TECHNOLOGY INC., Seoul (KR)

( * ) Notice: Subject to any disclaimer, the term of this patent is extended or adjusted under 35 U.S.C. 154(b) by 474 days.

(21) Appl. No.: 14/232,480

(22) PCT Filed: Jul. 13, 2012

(86) PCT No.: PCT/KR2012/005636
§ 371 (c)(1),
(2), (4) Date: Jan. 13, 2014

(87) PCT Pub. No.: WO2013/009151
PCT Pub. Date: Jan. 17, 2013

(65) Prior Publication Data
US 2014/0168419 A1    Jun. 19, 2014

(30) Foreign Application Priority Data

Jul. 13, 2011    (KR) .................. 10-2011-0069301

(51) Int. Cl.
*G01B 9/00*    (2006.01)
*G01B 11/00*    (2006.01)
(Continued)

(52) U.S. Cl.
CPC ..... *G06T 7/0004* (2013.01); *G01N 21/95607* (2013.01); *G01N 21/95684* (2013.01); *H04N 5/2256* (2013.01)

(58) Field of Classification Search
CPC .......... G01B 9/08; G01B 11/24; G01B 21/00; G01B 9/00; G01B 11/00; G01D 7/00;
(Continued)

(56) References Cited

U.S. PATENT DOCUMENTS 5,129,009 A * 7/1992 Lebeau ................ G01N 21/956
348/87
5,495,535 A * 2/1996 Smilansky ....... G01N 21/95607
348/E7.085
(Continued)

FOREIGN PATENT DOCUMENTS

CN    1121368    4/1996
JP    3-167456    7/1991
(Continued)

OTHER PUBLICATIONS

International Search Report of International Application No. PCT/KR2012/005636, dated Jan. 28, 2013.

*Primary Examiner* — Jamie J Atala
*Assistant Examiner* — Patrick E Demosky
(74) *Attorney, Agent, or Firm* — Kile Park Reed & Houtteman PLLC (57) ABSTRACT

To inspect a board, first, a measurement area is set on the board and a reference data of the measurement area is obtained. Then, a measurement data of the measurement area is obtained per colors, and a lighting condition is set using the reference data of the measurement area and the measurement data obtained per colors. Next, a feature object in the measurement area is set, and a distortion quantity between the reference data and the measurement data is obtained by comparing the reference data corresponding to the feature object and the measurement data corresponding to the feature object obtained under the lighting condition. Then, an inspection area is set by compensating the distortion quantity. Therefore, it is possible to compensate the distortion and set precisely the inspection area.

12 Claims, 4 Drawing Sheets

(51) Int. Cl.
*G06T 7/00* (2017.01)
*G01N 21/956* (2006.01)
*H04N 5/225* (2006.01)

(58) Field of Classification Search
CPC .......... G01D 9/00; G01D 21/00; G01N 21/00;
G01N 21/84; G01N 21/88; G01N
21/8851; G01N 21/95; G01N 21/956;
G01N 2021/00; G01N 2021/84; G01N
2021/88; G01N 2021/8851; G01N
2021/95; G01N 2021/956; G01N
2021/95607; G01N 2021/95638; G01N
11/24; G06F 11/00; G06F 11/30; G06F
1/32; G06F 11/34; G06F 15/00; G06F
15/16; G06F 17/00; G06F 17/10; G06F
17/40; G06F 19/00
USPC ...................................................... 702/1, 85
See application file for complete search history.

(56) References Cited

U.S. PATENT DOCUMENTS

| | | | | |
|---|---|---|---|---|
| 5,608,453 | A * | 3/1997 | Gerber ................ | G01N 21/956 348/125 |
| 6,539,106 | B1 * | 3/2003 | Gallarda ............. | G01R 31/307 382/149 |
| 7,218,389 | B2 * | 5/2007 | Uto ....................... | G01N 21/94 356/237.2 |
| 7,400,393 | B2 * | 7/2008 | Shibata ........... | G01N 21/95607 356/237.1 |
| 7,697,746 | B2 * | 4/2010 | Kawaguchi ......... | G01N 21/956 382/144 |
| 2002/0113234 | A1 * | 8/2002 | Okuda ............... | G01N 21/9501 257/48 |
| 2002/0161534 | A1 * | 10/2002 | Adler .................. | G01N 21/956 702/35 |
| 2004/0026633 | A1 * | 2/2004 | Gunji .................. | G01R 31/305 250/492.1 |
| 2004/0208350 | A1 * | 10/2004 | Rea ....................... | G01M 11/00 382/128 |
| 2005/0254066 | A1 * | 11/2005 | Mamiya ................ | G01B 11/25 356/604 |
| 2006/0153439 | A1 * | 7/2006 | Moriya ........... | G01N 21/95684 382/147 |
| 2007/0172111 | A1 * | 7/2007 | Ikeda .................... | G06T 7/0006 382/149 |
| 2007/0177787 | A1 * | 8/2007 | Maeda ............... | G06K 9/00557 382/141 |
| 2007/0201018 | A1 * | 8/2007 | Takeda ............ | G01N 21/95607 356/237.2 |
| 2007/0258070 | A1 * | 11/2007 | Fujiwara ............. | G03F 7/70341 355/53 |
| 2009/0290783 | A1 * | 11/2009 | Sakai .................. | G01N 21/9501 382/149 |
| 2010/0188486 | A1 * | 7/2010 | Amanullah ........ | G01N 21/8806 348/48 |
| 2010/0289893 | A1 * | 11/2010 | Yoo ....................... | G01B 11/24 348/135 |

FOREIGN PATENT DOCUMENTS

| | | |
|---|---|---|
| JP | 2001-283194 | 10/2001 |
| JP | 2001-289793 | 10/2001 |
| JP | 3249509 | 11/2001 |
| JP | 2003-97931 | 4/2003 |
| JP | 2003-107669 | 4/2003 |
| JP | 2004-317155 | 11/2004 |
| JP | 2005-291760 | 10/2005 |
| JP | 2006-099758 | 4/2006 |
| JP | 2008-84054 | 4/2008 |
| JP | 2009-105230 | 5/2009 |
| JP | 2010-27964 | 2/2010 |
| JP | 2010-237210 | 10/2010 |
| KR | 10-2008-0002044 | 1/2008 |
| KR | 10-2010-0108877 | 10/2010 |
| KR | 10-2011-0052956 | 5/2011 |
| WO | 2009/142390 | 11/2009 |

* cited by examiner

INSPECTION METHOD

TECHNICAL FIELD

Exemplary embodiments of the present invention relate to an inspection method. More particularly, exemplary embodiments of the present invention relate to an inspection method of a printed circuit board.

BACKGROUND ART

In general, at least one printed circuit board is equipped in an electronic device and circuit pattern, connection pad, driving chip electronically coupled to the connection pad, etc. are mounted on these printed circuit boards.

In general, a shape measurement device is used to confirm if various elements as mentioned above are mounted or aligned properly.

In a conventional shape measurement device, a predetermined measurement area is set, and test if a predetermined circuit element is formed properly within the predetermined measurement area. In a conventional measurement area setting method, simply a theoretical area that a circuit element is present is set as a measurement area.

The measurement area should be set at exact position in a desiring measurement area so that a circuit element is measured properly, but, due to a wrap or distortion of base board, in conventional measurement area, it is not possible to set an exact position in a desiring measurement area, and constant difference occurs between an image captured by a camera and a theoretical position of the circuit element.

Therefore, there is a need to set the measurement area such that a distortion of measurement object that is described above may be compensated properly.

DISCLOSURE

Technical Problem

Accordingly, an object of the present invention is to obtain an optimized lighting condition to obtain a feature object of good quality, and therefore, it is possible to provide an inspection method with the measurement area being set more precise.

Technical Solution

According to an exemplary embodiment of the present invention, to inspect a board, first, a measurement area is set on a surface of the board. Then, a reference data of the measurement area is obtained. Next, a measurement data of the measurement area are obtained for each color. Then, a lighting condition is set using the obtained reference data of the measurement area and the obtained measurement data for each color. Next, a feature object of the measurement area is set. Then, a distortion quantity between the reference data and the measurement data is obtained by comparing the reference data corresponding to the feature object and the measurement data corresponding to the feature object. Next, an inspection area with compensated distortion quantity is set in the measurement area.

The method of setting the lighting condition using the obtained reference data of the measurement area and the measurement data for each color, comprises setting a reference mask area that includes conductive pattern within the reference data and a reference no mask area that does not include conductive pattern, setting a measuring mask area corresponding to the reference mask are and a measuring no mask area corresponding to the reference no mask area within the measurement data for each colors, and setting a lighting condition such that a difference of gray scale between the measuring mask area and the measuring non mask area becomes larger.

The reference mask may correspond to a layer for wiring a signal line (signal layer) which forms the board.

In an exemplary embodiment, the difference of the gray scale between the measuring mask area and the measuring no mask area is defined by difference between a representative value of a gray scale of the measuring mask area existing within the measurement area and a representative value of a gray scale of the measuring no mask area existing within the measurement area.

In another embodiment, the feature object is set as feature block in block unit such that a predetermined shape is included within the measurement area, setting the feature object of the measurement area may be performed before setting the lighting condition that is set by comparing the reference data of the measurement area and the measurement data for each colors. The difference of gray scale between the measuring mask area and measuring no mask area may be defined by difference between a representative value of a gray scale of the measuring mask area existing within the feature block and a representative value of a gray scale of the measuring no mask area existing within the feature block.

The colors may include a first color, a second color, and a third color which are different from each other. The first color, the second color, and the third color may be obtained directly from a measurement device. Also, the color may further include at least one of a fourth color combining the first and the second color, a fifth color combining the first and the third color, a sixth color combining the second and the third color, and a seventh color combining the first, the second, and the third color.

The distortion quantity may be obtained by quantified conversion formula between the reference data and the measurement data, and the quantified conversion formula is defined by using at least one of change of position, change in slope, change in size, and transformation degree that are obtained by comparing the reference data and the measurement data.

The feature object may be set as feature block in block unit such that a predetermined shape is included within the measurement area, the predetermined shape of the feature block may have two-dimensional identifier such that a possibility of misidentification due to an adjacent shape is removed.

According to another exemplary embodiment of the present invention, first, the measurement area is set to inspect the board. Then, the feature object of the measurement area is set. Next, lights having different condition are irradiated toward the measurement area. Then, measurement data are obtained from the measurement area under the different lighting conditions. Next, the lighting condition is set by using the measurement data obtained from the different lighting conditions. Then, the distortion quantity of the measurement area is obtained by comparing the reference data corresponding to the feature object and the measurement data from the feature object obtained from the lighting condition. Next, the distortion quantity of the measurement area is compensated and then, the inspection area is set.

In an exemplary embodiment, obtaining the measurement data of the measurement area under the different lighting conditions may be obtained by irradiating lights and capturing images with two or more colors toward the measurement area. The colors may include the first color, the second color, and the third color which are different to each other. The first color, the second color, and the third color may be obtained directly from the measurement device, the colors may further include at least one of the fourth color combining the first and the second color, the fifth color combining the first and the third color, the sixth color combining the second and the third color, and the seventh color combining the first, the second, and the third color.

In an exemplary embodiment, setting the lighting condition using the measurement data under the different lighting conditions may include setting reference mask area including the feature object and setting reference no mask area not including the feature object within the reference data, dividing into measuring mask area corresponding to the reference mask area within the measurement data according to the different lighting conditions and measuring no mask area corresponding to the reference no mask area, and setting the lighting condition based on the gray scale between the measuring mask area and the measuring no mask area. The reference mask area may include the base board which at least comprises one layer for wiring signal lines (signal layer). Setting the lighting condition based on gray scale between the measuring mask area and the measuring no mask area, the lighting condition is set such that the difference of gray scale between the measuring mask area and the measuring no mask area becomes larger. The difference of gray scale between measuring mask area and measuring no mask area may be defined by difference between a representative value of a gray scale of measuring mask area and a representative value of a gray scale value of measuring no mask area.

The feature object for the measurement area may be set as a feature block in a block unit such that the predetermined shape should be included within the measurement area, setting the feature object for the measurement area may be processed before setting the lighting condition that uses the measurement data from different lighting condition, and the difference of gray scale between the measuring mask area and measuring no mask area may be defined by subtracting difference between a representative value of a gray scale of measuring mask area existing within the feature block and a representative value of a gray scale of measuring no mask area existing within the feature block.

In an exemplary embodiment, the distortion quantity may be obtained by quantified conversion formula between the reference data and the measurement data, and the quantified conversion formula is defined by using at least one of change in position, change in slope, change in size, and transformation degree that are obtained by comparing the reference data and the measurement data.

In an exemplary embodiment, the feature object may be set as feature block in a block unit such that a predetermined shape is included within the measurement area, and the predetermined shape of the feature block unit may contain two-dimensional identifier such that a possibility of mis-identification due to an adjacent shape is removed.

According to another embodiment of the present invention, to inspect the board, the reference mask area and the reference no mask area is set. Then, the data is obtained by irradiating and imaging different lighting condition. Next, the obtained measurement data is divided into measuring mask area corresponding to the reference mask area and measuring no mask area corresponding to the reference no mask area. Then, the lighting condition is set such that difference of gray scale values between the measuring mask area and measuring no mask area becomes larger.

In an exemplary embodiment, the inspection method may further comprise obtaining the feature object data within the measurement area using the lighting condition, obtaining the distortion quantity of the measurement area by comparing the reference data corresponding to the feature object and the measured feature object data with the lighting condition, and setting the inspection area compensating the distortion quantity.

Advantageous Effects

According to the present invention, by setting the lighting condition such that a difference between the gray scales increases, it is possible to obtain optimized lighting condition to get a high-quality of feature object, and as a result, more accurate inspection area may be set.

Also, by performing inspection process, such as defect detection, based on the lighting condition described above, defect judgment of a board may be done more accurately.

MODE FOR INVENTION

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that, although the terms first, second, third etc. may be used herein to describe various elements, components, regions, layers and/or sections, these elements, components, and/or sections should not be limited by these terms. These terms are only used to distinguish one element, component, region, layer or section from another region, layer or section. Thus, a first element, component, or section discussed below could be termed a second element, component, or section without departing from the teachings of the present invention.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

For convenience, same numerals are used for identical or similar elements of an apparatus of cutting a tempered board and the conventional one.

Hereinafter, with reference to the drawings, preferred embodiments of the present invention will be described in detail.

Figure 1:
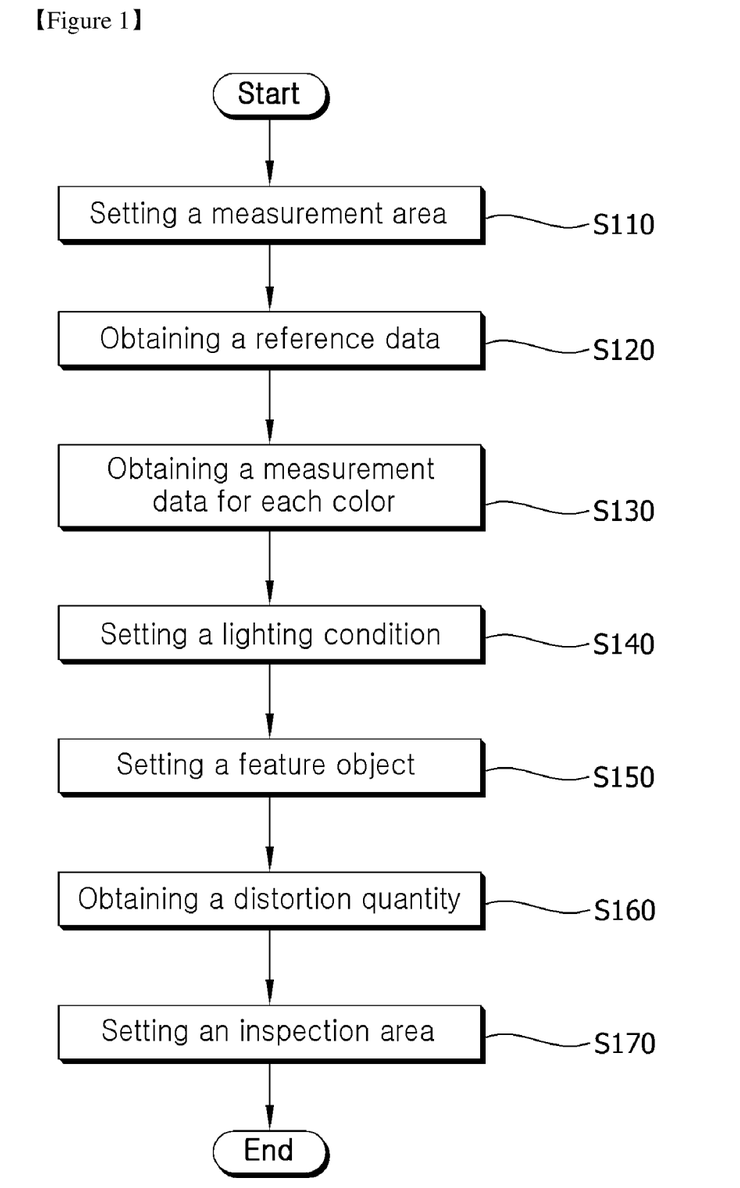
FIG. 1 is a flow chart showing an inspection method according to an embodiment of the present invention.
Figure 2:
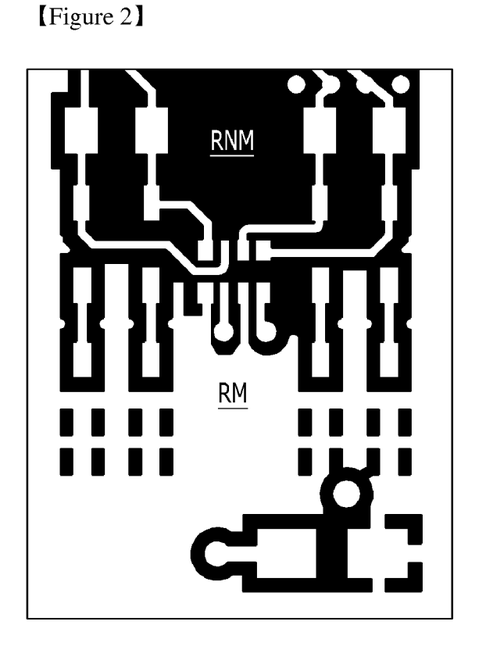
FIG. 2 is a floor plan showing a reference data of the inspection method of FIG. 1 according to an embodiment of the present invention.
Figure 3:
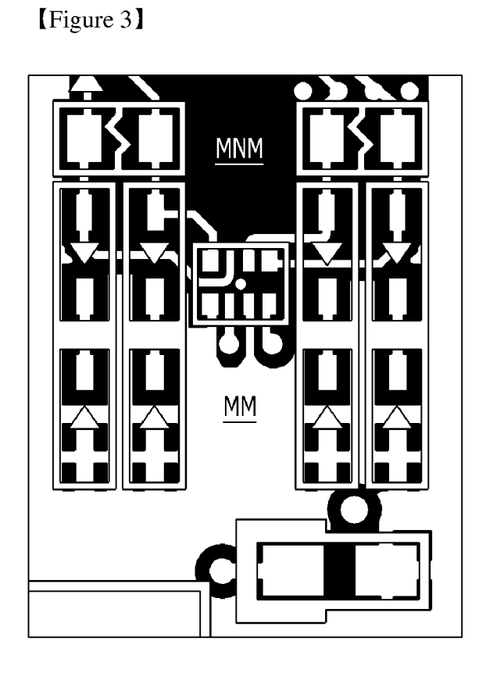
FIG. 3 is a floor plan showing a measurement data of the inspection method of FIG. 1 according to an embodiment of the present invention.

FIG. 1 is a flow chart showing an inspection method according to an embodiment of the present invention, FIG. 2 is a floor plan showing a reference data of the inspection method of FIG. 1 according to an embodiment of the present invention, and FIG. 3 is a floor plan showing a measurement data of the inspection method of FIG. 1 according to an embodiment of the present invention.

Referring to FIGS. 1-3, first, a measurement area is set on a board (S110).

The measurement area is a predetermined area set on a surface of the board to inspect a failure of the board, for example, a field of view of a camera equipped in an inspection device such as 3-dimensional shape measurement device.

Then, a reference data RI of the measurement area is obtained (S120).

The reference data RI may be a theoretical floor plan of the board (100) as shown in FIG. 2.

In an exemplary embodiment, the reference data RI may be obtained from CAD information or gerber information that shape information of the board is recorded. The CAD information and the gerber information includes design criteria information of the board, in general, alignment information such as pad, circuit pattern, hole pattern, etc. are included.

In another embodiment, the reference data RI may be obtained from learning information from learning mode. For example, when no board information is found as a result of acquiring for board information from a database, the learning mode may be implemented by performing learning for the bare board, after then, producing pad and wiring information of the bare board, and retrieving the board information on the database. In other words, design criteria information of the board are obtained by performing learning for the bare board in learning mode, and the reference data RI is obtained from the design criteria information.

Next, a measurement data of the measurement area PI is obtained for each color (S130).

The measurement data, for example, as shown in FIG. 3, may be a real image captured from the inspection device such as 3-D shape measurement device corresponding to the reference data RI. The measurement data PI is similar to the reference data RI shown in FIG. 2, but the measurement data is slightly distorted as the board 100 is wrapped or distorted.

In an exemplary embodiment, the measurement data may be obtained by irradiating lights toward the measurement area using lighting part of the inspection device, and capturing image of a reflected light of the irradiated lights using a camera equipped in the inspection device.

In an exemplary embodiment, the colors may include a first color, a second color, and a third color which are different from each other. In other words, the lighting part may include a first lighting portion generating light of first color, a second lighting portion generating light of second color, and a third lighting portion generating light of third color. As a result, the first color, the second color, and the third color are directly obtained from the lighting part of the inspection device. For example, the first color, the second color, and the third color may be red, green, and blue, respectively.

The measurement data may be obtained from other colors which are different to the first color, the second color, and the third color. For example, the color may further include at least one of a fourth color combining the first and the second color, a fifth color combining the first and the third color, a sixth color combining the second and the third color, and a seventh color combining the first, the second and the third color. For example, the fourth color, the fifth color, the sixth color, and the seventh color may be yellow, magenta, cyan, and white, respectively.

Thus, as the measurement data PI are obtained for each color, different measurement data are obtained as much as the number of colors.

Next, the lighting condition is set by comparing the reference data RI of the measurement area PI and the measurement data per colors (S140), and a feature object of the measurement area is set (S150).

The lighting condition may be set (S140) before or after the feature object is set (S150).

Figure 4:
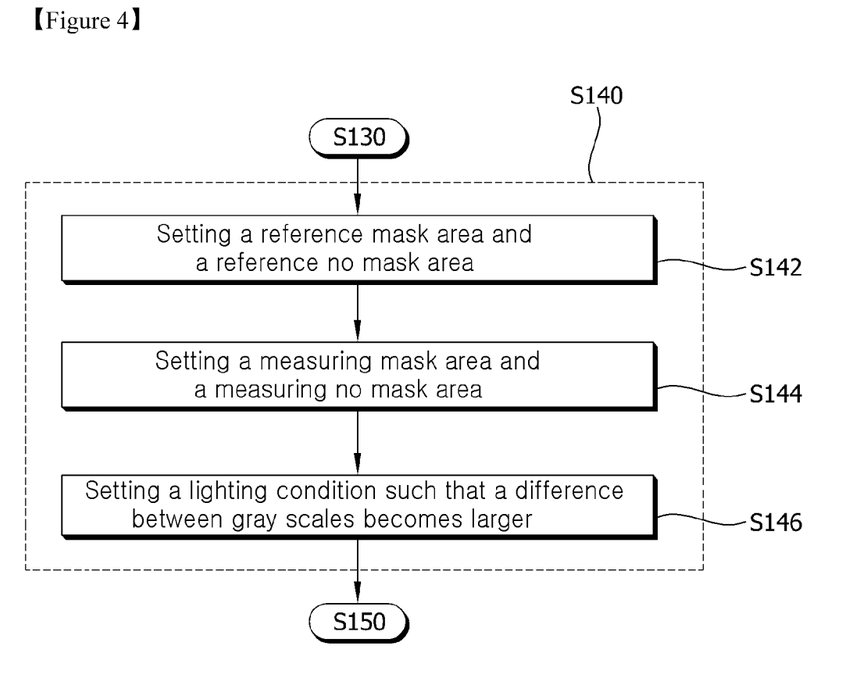
FIG. 4 is a flow chart showing a lighting condition setting of FIG. 1 according to an embodiment of the present invention.

FIG. 4 is a flow chart showing a lighting condition setting of FIG. 1 according to an embodiment of the present invention.

Referring to FIG. 4, to set the lighting condition, first, the reference mask area that includes conductive pattern and reference no mask area that does not include conductive pattern (S142) is set.

The conductive pattern includes circuit pattern, hole pattern, and has a shape corresponding or including a feature object. The feature object which will be described later is used as a comparison reference to obtain a distortion quantity between the reference data RI and the measurement data PI or a distortion quantity between the reference data and the measured data obtained after component is formed on the board.

The feature object may include an object that has predetermined shape and is located in a coordinate within the reference data RI and the measurement data PI, and may be directly corresponding to the conductive pattern. For example, the feature object may include hole pattern formed on the board, or corner part of wrapped circuit pattern, etc., and the distortion quantity which will be described later may be obtained by comparing the reference data RI based on center coordinate of the hole pattern or coordinate of the corner point of the wrapped circuit pattern.

Alternatively, the feature object may be feature block that includes predetermined shape, and the conductive pattern may be corresponding to the predetermined shape. In this case, relatively accurate comparison may be done by comparing the measurement data PI and the reference data RI based on the feature object of various shape within the feature block.

The predetermined shape of the plurality of feature blocks may have two-dimensional identifier to define two-dimensional plane such that a misidentification possibility due to an adjacent shape is removed. For example, bent line, bent square, bent circle, or combination of them within the feature block may be included, but straight line is not included as it is no possible to define two-dimensional plane.

The reference data RI, as shown in FIG. 2, may be divided into reference mask area RM that feature object is present and reference no mask area RNM that feature object is not present.

In FIG. 2, the reference mask area RM that feature object is present is indicated in gray, and the reference no mask area RNM that feature object is not present is indicated in black. The division may be performed automatically based on a type of predetermined the feature object, or may be performed manually based on a direct selection of a user.

For example, the reference mask RM area may be corresponding to the board layer for wiring signal line (signal layer) which forms the board, and the reference no mask area RNM may be area other than that.

Then, the measuring mask area MM and measuring no mask area MNM within the measurement data PI for each color are set (S144). The measuring mask area MM is corresponding to the reference mask area RM, and the measuring no mask area MNM is corresponding to the reference no mask area RNM.

In an exemplary embodiment as shown in FIG. 3, the measurement data PI per color may be divided into the measuring mask area MM and measuring no mask area MNM.

Next, lighting condition is set such that the difference of gray scale between measuring mask area MM and gray scale value of measuring no mask area MNM becomes larger (S146).

The feature object is used as comparison reference to obtain conversion relationship between the reference data RI and the measurement data PI, so that it must be exactly identified in the reference data RI and the measurement data PI. It is easy to identify the feature object if the area corresponding to the feature object and the area not corresponding to the feature object and adjacent to the feature object are distinguished clearly. Therefore, it is important to find the lighting condition such that the area corresponding to the feature object and the area not corresponding to the feature object are distinguished clearly.

For example, the lighting condition is set by finding lights in measurement data PI measured for each color such that the difference of the gray scale between the measuring mask area MM and the gray scale value of the measuring no mask area MNM becomes larger.

In an exemplary embodiment, the difference of gray scales may be defined by difference between a representative value of the measuring mask area MM and a representative value of the measuring no mask area MNM within the measurement area. For example, the representative value may include average value, median value, and mode.

In another embodiment, if the feature object is feature block unit, the difference between gray scales may be defined by difference between a representative value of gray scale of the measuring mask area existing within the feature block and a representative value of gray scale of the measuring no mask area existing within the feature block. For example, the representative value may include average value, median value and mode.

In this case, the feature object may be set before lighting condition set (S140).

Figure 5:
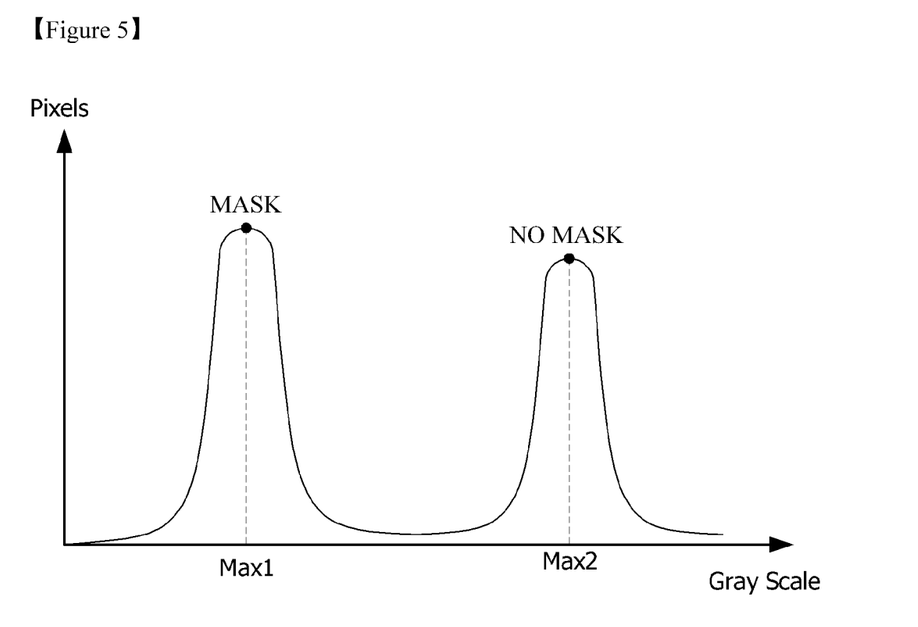
FIG. 5 is a graph describing a process of looking for light such that a difference of gray scales becomes larger of FIG. 4 according to an embodiment of the present invention.

FIG. 5 is a graph describing a process of looking for a light such that a difference between gray scales becomes larger of FIG. 4 according to an embodiment of the present invention.

Referring to FIG. 5, the gray scale value of the measuring mask area MM and the gray scale value of the measuring no mask area MNM in measurement data PI which are obtained for each color are shown in histogram.

The histogram shows two convex up forms, the left one indicates the measuring mask area MM and the right one indicates the measuring no mask area MNM.

For example, the representative value of the measuring mask area MM may be a first mode (Max1), and the representative value of the measuring no mask area MNM may be a second mode (Max2). Of course, the representative values of the measuring mask area MM and measuring no mask area MNM may be average value, median value, and so on.

Then, the distortion quantity is obtained by comparing the reference data corresponding to the feature object and the measurement data corresponding to the feature object obtained under lighting condition (S160).

The distortion quantity may be obtained by quantified conversion formula using the reference data RI corresponding to the comparison block and the measurement data PI.

The measurement data PI may be distorted compared to the reference data RI, which is theoretical data, due to the distortion and wrapping of the board, the relationship between the reference data RI and the measurement data PI may be defined by the distortion quantity that is defined by the quantified conversion formula.

The quantified conversion formula may be defined using data comprised with at least one of change in position, change in slope, change in size, and transformation degree which re obtained by comparing the reference data RI of the comparison block and the measurement data PI.

Meanwhile, in an exemplary embodiment, the quantified conversion formula may be represented as following.

$$P_{cad}f(tm)=P_{real} \qquad \text{[Formula 1]}$$

In the above formula, $P_{cad}$ is a coordinate of a target according to the CAD or gerber information, in other words, coordinate of the reference data, $f(tm)$ is transfer matrix corresponding to the conversion formula, and $P_{real}$ is a target coordinate in the measurement data PI obtained from a camera. The transfer matrix is known by getting the theoretical coordinate $P_{cad}$ and the real coordinate $P_{real}$ from the measurement data PI.

For example, the transfer matrix may include a coordinate transformation matrix including affine transformation that point correspondence relation upon n-dimensional space is represented in simple equation or perspective transformation. To define the coordinate transformation matrix, the number of the feature object is set properly, for example, 3 or more for affine transformation, and 4 or more for perspective transformation.

Meanwhile, the measurement data PI, shown in FIG. 3 as an example, may be measurement data (or captured image) before or after mounting part.

Then, the distortion quantity is compensated and the inspection area is set (S170).

As the distortion quantity indicates the degree of distortion obtained by comparing the reference data RI with the measurement data PI, and by compensating the distortion quantity, the inspection area may be close to the real shape of the board compared to the first measurement area. Setting the inspection area may be all or portion of the measurement area.

It is possible to examine more accurate whether the defective part of the inspection area since the distortion quantity is compensated and then, the inspection area is set in the measurement data. At this time, when the measurement data PI is measured before mounting part as shown in FIG. 3, the inspection is performed after obtaining separate measurement data after mounting part. Alternatively, when the measurement data PI is measured after mounting part, the inspection is performed using these data.

Next, optionally, it is possible to test if the inspection area is valid. At this point, the test may be performed by directly using the feature object used for obtaining distortion quantity, or separately using the feature object for the test.

Figure 6:
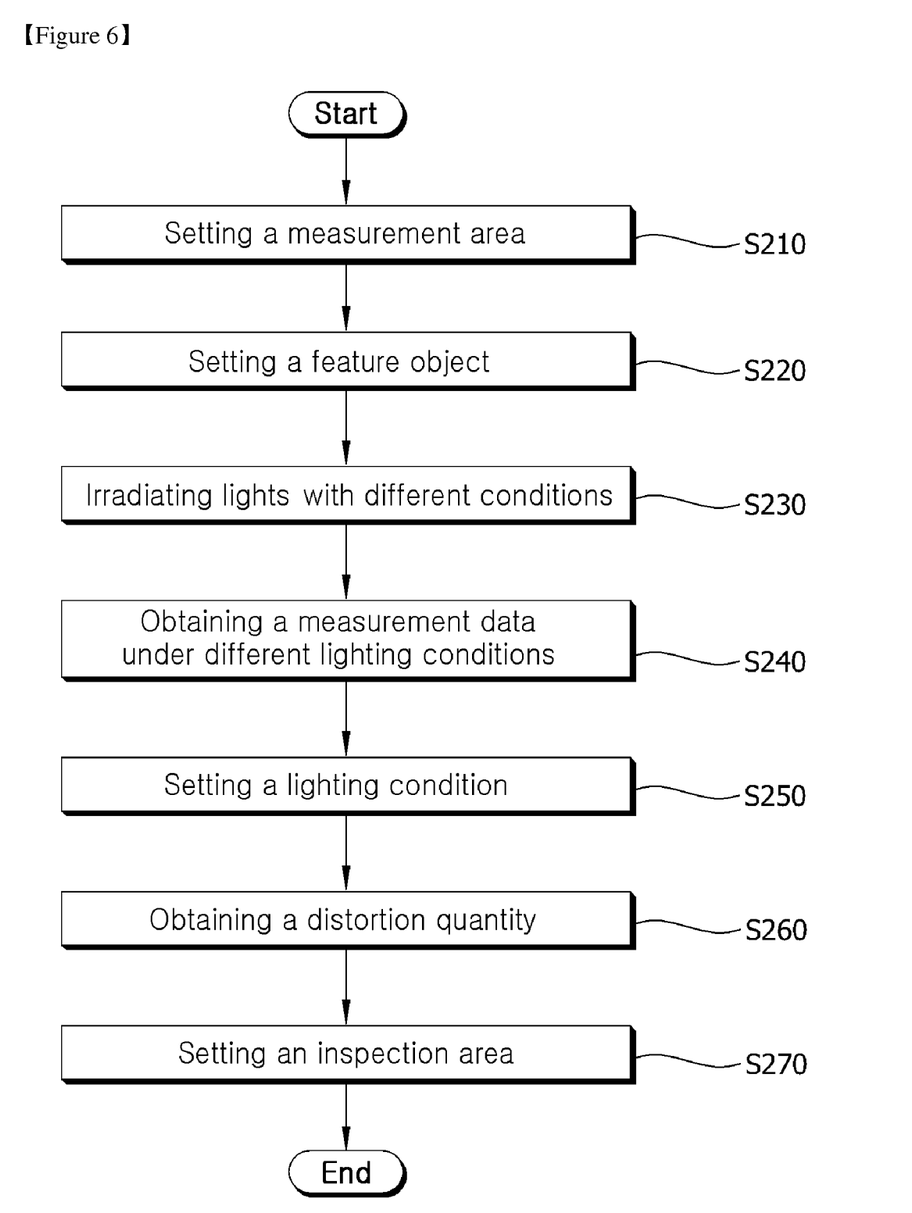
FIG. 6 is a flow chart showing an inspection method according to another embodiment of the present invention.

FIG. 6 is a flow chart showing an inspection method according to another embodiment of the present invention.

Referring to FIG. 6, according to another embodiment of the present invention, to set the inspection area with compensated distortion quantity, first, the measurement area is set on the board (S210).

As this step may substantially be the same to the step of setting the inspection area (S110) in FIG. 1, duplicated detailed description will be omitted.

Then, the feature object of the measurement area is set (S220).

For example, this step may substantially be the same to the step of setting the feature object (S150) in FIG. 1.

Next, lights having different lighting condition from each other are irradiated towards the measurement area (S230).

For example, the concept of lighting condition of this step may substantially be the same to the step for the concept of setting lighting condition described in FIGS. 1-5.

Then, the measurement data is obtained from the measurement area under different lighting conditions (S240).

For example, the concept of measurement data may substantially be the same to the concept of measurement data described in FIGS. 1-5, and this step may substantially be the same to the step of obtaining the measurement data (S130) in FIG. 1. In an exemplary embodiment the measurement data are obtained by irradiating lights with two or more colors and imaging the light.

Next, the lighting condition is set using the measurement data obtained from different lighting condition (S250).

For example, this step may substantially be the same to the step of setting lighting condition (S140) in FIG. 1, setting the lighting condition may be performed by comparing the reference data and the measurement data obtained from different lighting condition.

Then, the distortion quantity is obtained by comparing the reference data corresponding to the feature object and the measurement data obtained from the feature object under different lighting condition (S260).

For example, this step may substantially be the same to the step of obtaining the distortion quantity (S160) in FIG. 1.

Next, the inspection area is set by compensating the distortion quantity (S270).

For example, this step may substantially be the same to the step of setting the inspection area (S170) in FIG. 1.

According to the present invention, by setting the lighting condition such that the difference between gray scales increases, it is possible to obtain optimized lighting condition to get a high-quality of feature object, and as a result, more accurate inspection area may be set.

Also, by performing inspection process such as defect detection based on the lighting condition described above, more accurate defect judgment of the board may be done.

It will be apparent to those skilled in the art that various modifications and variation may be made in the present invention without departing from the spirit or scope of the invention. Thus, it is intended that the present invention cover the modifications and variations of this invention provided they come within the scope of the appended claims and their equivalents.

The invention claimed is:

1. An inspection method comprising:
    setting a measurement area on a board;
    setting a feature object for the measurement area;
    irradiating lights having different lighting conditions from each other toward the measurement area;
    obtaining measurement data of the measurement area under each of the lighting conditions;
    performing a lighting condition setting operation based on the measurement data of the measurement area obtained under each of the lighting conditions to select one lighting condition among the lighting conditions, the lighting condition setting operation comprising:
        obtaining a gray scale of an area including the feature object and a gray scale of an area not including the feature object with respect to each measurement data obtained under each of the lighting conditions;
        obtaining a gray scale difference between the gray scale of the area including the feature object and the gray scale of the area not including the feature object with respect to each measurement data;
        comparing the gray scale differences of the area including the feature object and the gray scale of the area not including the feature object with each other to select one gray scale difference which is a largest of the gray scale differences; and
        selecting the one lighting condition among the lighting conditions, the one lighting condition corresponding to the one gray scale difference;
    obtaining a distortion quantity by comparing a measurement data of the measurement area under the one lighting condition and a reference data of the measurement area;
    compensating the measurement data of the measurement area under the one lighting condition using the distortion quantity to obtain a compensated measurement data; and
    setting an inspection area corresponding to the compensated measurement data in the measurement area.

2. The inspection method of claim 1, wherein obtaining a measurement data of the measurement area according to the different lighting conditions comprises irradiating lights with two or more colors toward the measurement area, and capturing an image.

3. The inspection method of claim 2, wherein the colors include a first color, a second color, and a third color, which are different from each other.

4. The inspection method of claim 3, wherein the first color, the second color, and the third color are obtained directly from a measurement device, and
    the colors further include at least one of a fourth color combining the first and the second color, a fifth color combining the first and the third color, a sixth color combining the second and the third color, and a seventh color combining the first, the second, and the third color.

5. The inspection method of claim 1, wherein performing the lighting condition setting operation further comprises:
setting a reference mask area that includes the feature object and a reference no mask area that does not include the feature object;
dividing into a measuring mask area corresponding to the reference mask area and a measuring no mask area corresponding to the reference no mask area within the measurement data for the lights having the different lighting conditions; and
selecting the one lighting condition based on a difference of a gray scale between the measuring mask area and the measuring no mask area.

6. The inspection method of claim 5, wherein the reference mask area includes at least a layer for wiring a signal line (signaling layer), which forms the board.

7. The inspection method of claim 5, wherein the difference of the gray scale between the measuring mask area and measuring no mask area is defined by a difference between a representative value of a gray scale of the measuring mask area and a representative value of a gray scale of the measuring no mask area.

8. The inspection method of claim 5, wherein the feature object is set as a feature block in a block unit including a predetermined shape,
setting a feature object for the measurement area is performed before selecting the one lighting condition, and
the difference of the gray scale between the measuring mask area and the measuring no mask area is defined by a difference between a representative value of a gray scale of the measuring mask area that is present within the feature block and a representative value of a gray scale of the measuring no mask area that is present within the feature block.

9. The inspection method of claim 1, wherein the distortion quantity is obtained from a quantified conversion formula between the reference data and the measurement data, and the quantified conversion formula is defined by using at least one of change in position, change in slope, change in size, and transformation degree that are obtained by comparing the reference data and the measurement data.

10. The inspection method of claim 1, wherein the feature object is set as a feature block in a block unit including a predetermined shape, and the predetermined shape of the feature block has a two-dimensional identifier such that a possibility of misidentification due to an adjacent shape is removed.

11. An inspection method comprising:
setting a reference area including a feature object and another reference area not including a feature object with respect to a measurement area;
setting a measuring area corresponding to the reference area and another measuring area corresponding to the another reference area with respect to the measurement area;
irradiating lights having different lighting conditions from each other toward the measurement area;
obtaining measurement data of the measurement area under each of the lighting conditions;
performing a lighting condition setting operation based on the measurement data of the measurement area obtained under each of the lighting conditions to select one lighting condition among the lighting conditions, the lighting condition setting operation comprising:
obtaining a gray scale of an area including the feature object and a gray scale of an area not including the feature object with respect to each measurement data obtained under each of the lighting conditions;
obtaining a gray scale difference between the gray scale of the area including the feature object and the gray scale of the area not including the feature object with respect to each measurement data;
comparing the gray scale differences of the area including the feature object and the gray scale of the area not including the feature object with each other to select one gray scale difference which is a largest of the gray scale differences; and
selecting the one lighting condition among the lighting conditions based on the selected one gray scale difference.

12. The inspection method of claim 11, further comprising:
obtaining a data of the feature object within a measurement area of a board using the selected one lighting condition;
obtaining a distortion quantity of the measurement area by comparing a reference data corresponding to the feature object with the obtained data of the feature object obtained under the selected one lighting condition; and
setting an inspection area in the measurement area by compensating the distortion quantity.

\* \* \* \* \*